United States Patent
Tokumaru

(10) Patent No.: US 11,634,037 B2
(45) Date of Patent: Apr. 25, 2023

(54) TRAIN OPERATION CONTROL APPARATUS, OPERATION MANAGEMENT APPARATUS, TRAIN CONTROL SYSTEM, AND TRAIN OPERATION METHOD

(71) Applicant: Mitsubishi Electric Corporation, Tokyo (JP)

(72) Inventor: Makoto Tokumaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 450 days.

(21) Appl. No.: 16/761,524

(22) PCT Filed: Nov. 15, 2017

(86) PCT No.: PCT/JP2017/041145
§ 371 (c)(1),
(2) Date: May 5, 2020

(87) PCT Pub. No.: WO2019/097616
PCT Pub. Date: May 23, 2019

(65) Prior Publication Data
US 2020/0262300 A1   Aug. 20, 2020

(51) Int. Cl.
*B60L 15/40*   (2006.01)
*B61L 25/02*   (2006.01)
(Continued)

(52) U.S. Cl.
CPC ............ *B60L 15/40* (2013.01); *B61L 25/025* (2013.01); *B60L 2200/26* (2013.01);
(Continued)

(58) Field of Classification Search
CPC ........ B61L 25/025; B61L 27/16; B61L 27/40; B61L 25/021; B61L 23/18;
(Continued)

(56) References Cited

U.S. PATENT DOCUMENTS 9,278,702 B2 * 3/2016 Myokei ................... B61L 3/08
10,259,478 B1 * 4/2019 Gao ....................... B61L 27/20
(Continued)

FOREIGN PATENT DOCUMENTS

JP   3574917 B2   10/2004
JP   2005253141 A * 9/2005
(Continued)

OTHER PUBLICATIONS

Office Action dated Aug. 1, 2021, for corresponding Indian patent Application No. 202027018825, 5 pages.
(Continued)

*Primary Examiner* — Bickey Dhakal
(74) *Attorney, Agent, or Firm* — Buchanan Ingersoll & Rooney PC

(57) ABSTRACT

A train operation control apparatus mounted on a train includes: a non-contact range sensor that measures a first train interval between a rear end of a preceding train traveling ahead of the train and a head of the train; another non-contact range sensor that measures a second train interval between a head of a following train traveling behind the train and a rear end of the train; and on-board control transmission apparatus that, when being instructed to start control using the second train interval, controls operation of the train using the second train interval on the basis of an
(Continued)

instruction from an operation management apparatus that controls operation of a plurality of trains including the train, the preceding train, and the following train.

7 Claims, 13 Drawing Sheets

(51) Int. Cl.
  *B61L 15/00* (2006.01)
  *B61L 27/20* (2022.01)
(52) U.S. Cl.
  CPC ....... *B60L 2240/12* (2013.01); *B60L 2240/80* (2013.01); *B61L 15/0027* (2013.01); *B61L 27/20* (2022.01)
(58) Field of Classification Search
  CPC .. B61L 2201/00; B61L 15/0027; B60L 15/40; B60L 2200/26; B60L 2240/12; B60L 2240/80
  See application file for complete search history.

(56) References Cited

U.S. PATENT DOCUMENTS

| | | | |
|---|---|---|---|
| 2017/0008542 A1 | 1/2017 | Hagiwara et al. | |
| 2019/0077426 A1* | 3/2019 | Nishi | B61L 23/18 |
| 2019/0077427 A1* | 3/2019 | Itagaki | B60L 15/40 |

FOREIGN PATENT DOCUMENTS

| | | |
|---|---|---|
| JP | 2006298109 A | 11/2006 |
| WO | 2015118671 A1 | 8/2015 |

OTHER PUBLICATIONS

International Search Report (PCT/ISA/210), with translation, and Written Opinion (PCT/ISA/237) dated Feb. 20, 2018, by the Japan Patent Office as the International Searching Authority for International Application No. PCT/JP2017/041145.

Office Action dated Jun. 16, 2020, issued in corresponding Japanese Patent Application No. 2019-554104, 6 pages including 4 pages of English translation.

* cited by examiner

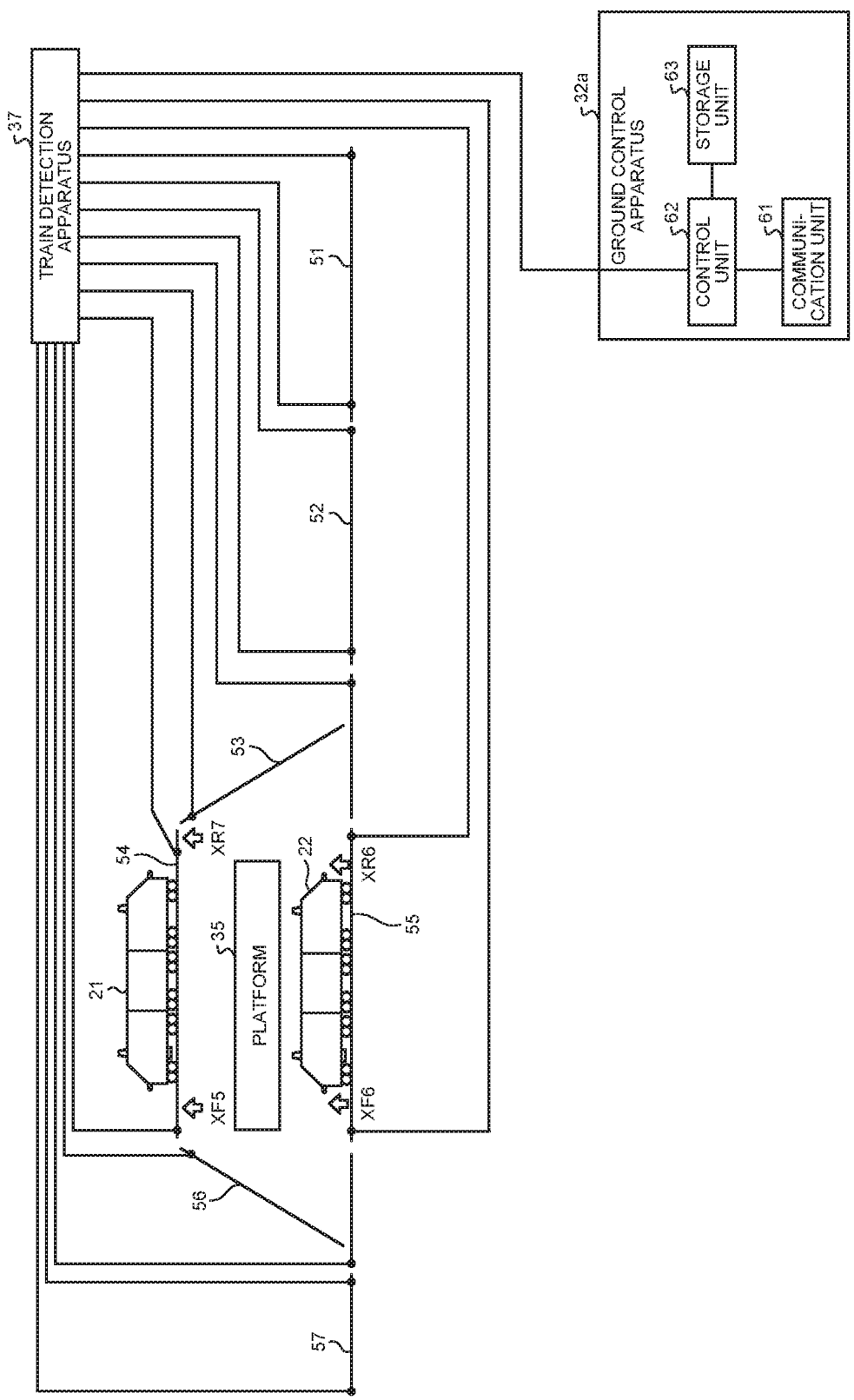

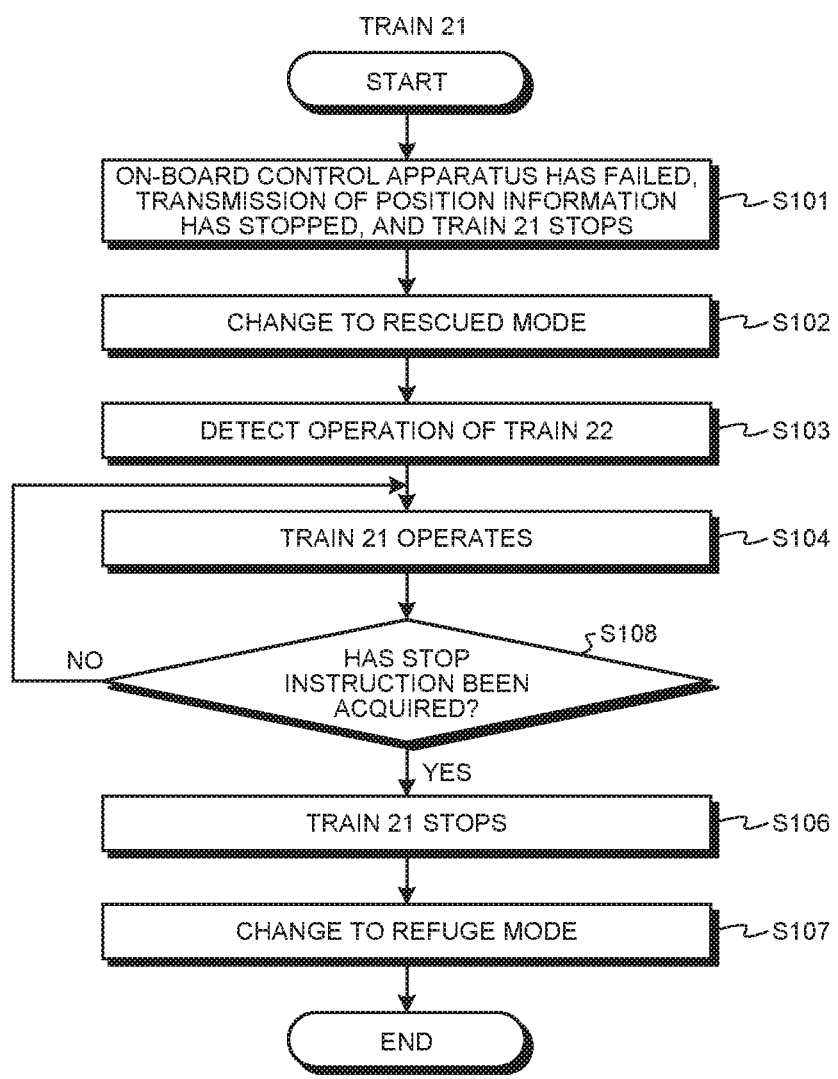

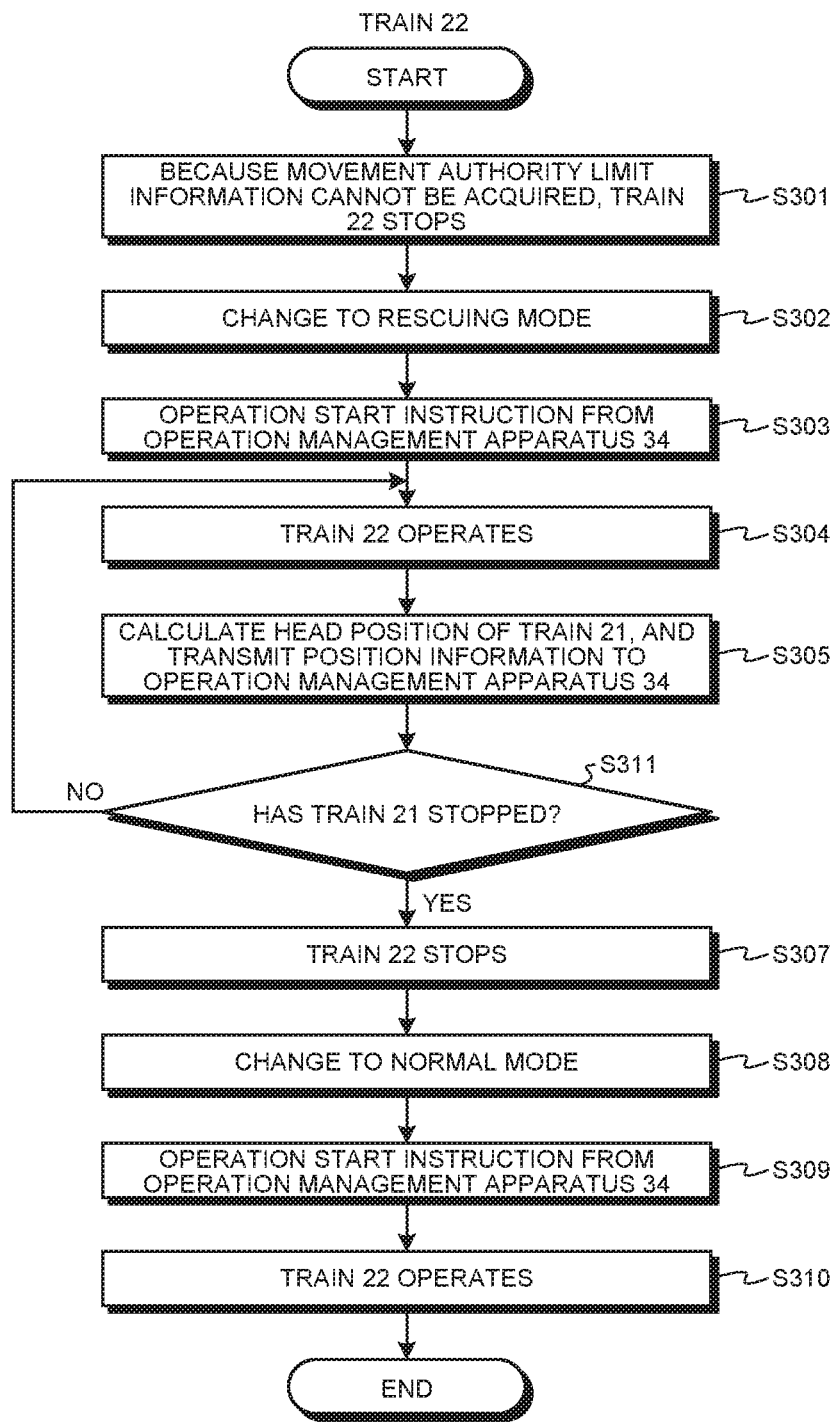

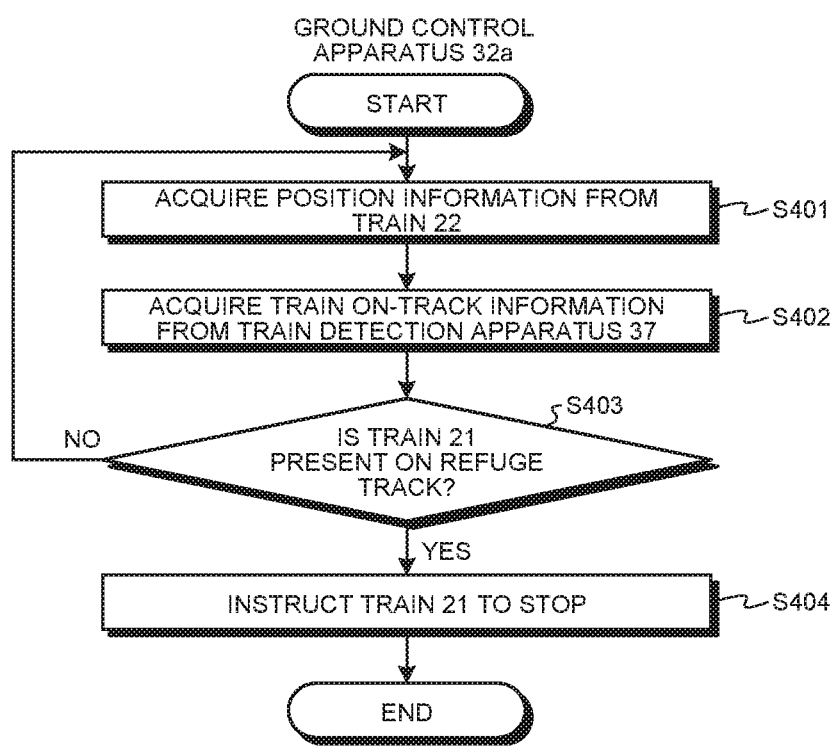

TRAIN OPERATION CONTROL APPARATUS, OPERATION MANAGEMENT APPARATUS, TRAIN CONTROL SYSTEM, AND TRAIN OPERATION METHOD

FIELD

The present invention relates to a train operation control apparatus that controls operation of a train, an operation management apparatus, a train control system, and a train operation method.

BACKGROUND

In a system for performing unmanned operation of trains, conventionally, a ground control apparatus manages positions of a plurality of trains within a control zone and a train interval for the trains, calculates a movement authority limit of each train for collision prevention, and transmits information on the movement authority limit to an on-board control apparatus mounted on each train. The on-board control apparatus calculates a stop pattern for stopping the train at the movement authority limit, and applies a brake to cause the train to decelerate when the stop pattern is exceeded. In addition, the on-board control apparatus determines the position of the train using a spot detection ground coil, and stops the train at a stop target position in a station using a stop position detection ground coil. A host equipment performs control on a departure time of each train and the like via the ground control apparatus to control unmanned operation of the train. Such a technique is disclosed in Patent Literature 1.

CITATION LIST

Patent Literature

Patent Literature 1: Japanese Patent Application Laid-open No. 2006-298109

SUMMARY

Technical Problem

However, according to the above-described conventional technique, when an on-board control apparatus fails, the position of a failed train that is a train on which the on-board control apparatus is mounted becomes indeterminate, and therefore, control for the unmanned operation of the failed train cannot be performed. In addition, also for a normal train that follows the failed train, a movement authority limit cannot be set because the position of the failed train that is a preceding train is indeterminate, and thereby control for the unmanned operation cannot be performed. In such a case, there has been a problem in that a train operator has to board the failed train, and operate and move the failed train to a refuge track where any trouble is not given to the operation in order to restart control for the unmanned operation.

The present invention has been made in view of the above circumstances, and an object thereof is to provide a train operation control apparatus that, when an on-board control apparatus mounted on a train fails, can cause the train to be operated without a situation where a train operator boards the train.

Solution to Problem

In order to solve the above-described problem and achieve the object, the present invention provides a train operation control apparatus mounted on a train, the apparatus comprising: a first range sensor to measure a first train interval between a rear end of a preceding train traveling ahead of the train and a head of the train; a second range sensor to measure a second train interval between a head of a following train traveling behind the train and a rear end of the train; and an on-board control transmission apparatus to control operation of the train using the second train interval when being instructed to start control using the second train interval on the basis of an instruction from an operation management apparatus that controls operation of a plurality of trains including the train, the preceding train, and the following train.

Advantageous Effects of Invention

The present invention achieves an advantageous effect that when an on-board control apparatus mounted on a train fails, a train operation control apparatus can cause the train to be operated without a situation where a train operator boards the train.

BRIEF DESCRIPTION OF DRAWINGS

FIG. 11 is a diagram illustrating how a ground control apparatus according to a second embodiment detects positions of the trains using a train detection apparatus and track circuits.

FIG. 12 is a flowchart illustrating a failed train operation process of the train in which the on-board control apparatus according to the second embodiment has failed.

FIG. 13 is a flowchart illustrating a failed train operation process of the following train behind the train in which the on-board control apparatus according to the second embodiment has failed.

FIG. 14 is a flowchart illustrating a failed train operation process of the ground control apparatus according to the second embodiment.

DESCRIPTION OF EMBODIMENTS

Hereinafter, a train operation control apparatus, an operation management apparatus, a train control system, and a train operation method according to each embodiment of the present invention will be described in detail with reference to the drawings. The present invention is not necessarily limited by the embodiments.

First Embodiment

Figure 1:
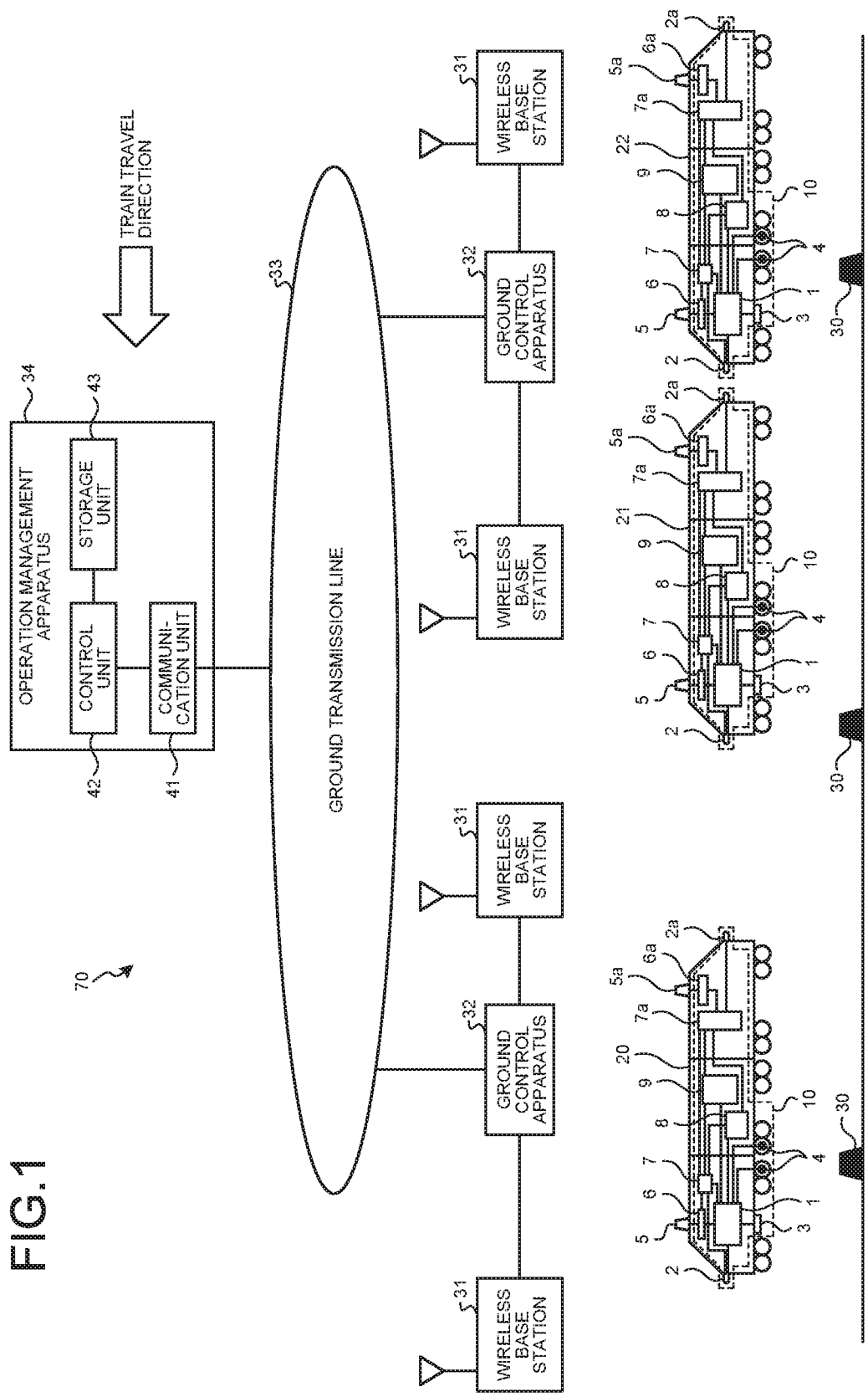
FIG. 1 is a diagram illustrating an example configuration of a train control system according to a first embodiment.

FIG. 1 is a diagram illustrating an example configuration of a train control system 70 according to a first embodiment of the present invention. The train control system 70 includes trains 20, 21, and 22, ground coils 30, wireless base stations 31, ground control apparatuses 32, a ground transmission line 33, and an operation management apparatus 34. Here, the trains 20 to 22 are traveling in a train travel direction indicated by an arrow in FIG. 1, that is, in a direction from right to left in FIG. 1. The ground coils 30, the wireless base stations 31, the ground control apparatuses 32, the ground transmission line 33, and the operation management apparatus 34 are facilities installed on a ground side.

The ground coils 30 transmit information to and receive information from a pickup coil 3, which will be described later, mounted on each of the trains 20 to 22. Each of the ground coils 30 transmits position information indicating a position where the ground coil 30 is installed to the pickup coil 3 mounted on each of the trains 20 to 22. The position information may be an identification (ID) representing the position where the ground coil 30 is set, or may be information directly indicating the position where the ground coil 30 is set.

The wireless base stations 31 transfer information such as position information received from the trains 20 to 22 to the ground control apparatuses 32, and transmit information such as movement authority limit information acquired from the ground control apparatuses 32 toward the tracks on which the trains 20 to 22 travel.

The ground control apparatus 32 collects position information on the trains within a control zone thereof. In the train control system 70, there are multiple ground control apparatuses 32, and the control zone is set for each ground control apparatus 32. The ground control apparatuses 32 calculate a movement authority limit of each train on the basis of the collected position information on multiple trains. The movement authority limit is, for example, a position obtained by leaving a margin distance in a rearward direction with respect to a rear end position of a preceding train traveling ahead of each train in order to prevent collision of each train. The ground control apparatus 32 transmits the calculated movement authority limit to the wireless base station 31 as movement authority limit information. The ground control apparatuses 32 also transmit the collected position information on the multiple trains to the operation management apparatus 34 via the ground transmission line 33.

The ground transmission line 33 is a transmission line used for the multiple ground control apparatuses 32 and the operation management apparatus 34 to transmit information to and receive information from other apparatuses. For example, the ground control apparatus 32 acquires position information on a train out of the control zone from another ground control apparatus 32 via the ground transmission line 33. The ground control apparatuses 32 transmit the position information on the multiple trains to the operation management apparatus 34 via the ground transmission line 33. The operation management apparatus 34 transmits information to the ground control apparatuses 32 via the ground transmission line 33, the information indicating a departure instruction, an instruction to change an operation mode, and the like for each of the trains 20 to 22. The operation mode indicates an operation state of each of the trains 20 to 22, and examples thereof include a rescued mode, a rescuing mode, a normal mode, and a refuge mode, as described later.

The operation management apparatus 34 acquires position information on the trains 20 to 22 within the control zone of each ground control apparatus 32 from the multiple ground control apparatuses 32. The operation management apparatus 34 manages a position where each train is present on a track, and transmits a departure command or the like for each train via the ground transmission line 33, the ground control apparatus 32, and the wireless base station 31 to each train. The operation management apparatus 34 includes a communication unit 41, a control unit 42, and a storage unit 43. The communication unit 41 transmits information to and receives information from the ground control apparatuses 32 via the ground transmission line 33. The control unit 42 manages operation of each train and controls departure timing of each train. The storage unit 43 stores position information on multiple trains, acquired from the ground control apparatuses 32.

The trains 20 to 22 transmit the position information on themselves to the ground control apparatuses 32 via the wireless base stations 31 using wireless communication. The trains 20 to 22 conduct their operations while controlling train intervals on the basis of a control signal such as movement authority limit information acquired from the ground control apparatuses 32 via the wireless base stations 31. Configurations of the trains 20 to 22 will be described. In the example of FIG. 1, each of the trains 20 to 22 is made up of three cars in which two cab cars each having a cab installed therein are arranged at the front and rear, and one intermediate car is connected between the cab cars, but the number of intermediate cars may be zero or two or more. Since the trains 20 to 22 have their configurations similar to one another, the train 21 will be described as a representative example. The train 21 includes a train operation control apparatus 10 that controls operation of the train 21. The train operation control apparatus 10 includes an on-board control apparatus 1, non-contact range sensors 2 and 2a, the pickup coil 3, a tacho-generator 4, antennas 5 and 5a, on-board radio apparatuses 6 and 6a, on-board control transmission apparatuses 7 and 7a, a brake control apparatus 8, and a propulsion control apparatus 9.

The non-contact range sensors 2 and 2a are each a distance sensor installed in the cab car. As described above, the train 21 travels from right to left of FIG. 1. In the train 21, the non-contact range sensor 2 that is a first range sensor is installed in the front cab car in the train travel direction illustrated in FIG. 1. In addition, in the train 21, the non-contact range sensor 2a that is a second range sensor is installed in the rear cab car in the train travel direction illustrated in FIG. 1. The non-contact range sensor 2 measures, as a first train interval, a train interval between the rear end of the train 20 that is a preceding train traveling ahead of the train 21 and the head of the train 21. The non-contact range sensor 2a measures, as a second train interval, a train interval between the head of the train 22 that is a following train traveling behind the train 21 and the rear end of the train 21.

The pickup coil 3 receives, from the ground coil 30, position information indicating the position where the ground coil 30 is installed, and outputs the position information to the on-board control apparatus 1. The tacho-generator 4 detects the speed of the train 21 and outputs speed information to the on-board control apparatus 1. The on-board radio apparatuses 6 and 6a are communicators that transmit a radio signal to and receive a radio signal from the wireless base station 31 via the antennas 5 and 5a. The antennas 5 and 5a are antenna elements that actually transmit and receive radio signals.

The on-board control apparatus 1 determines the position of the train 21 on the basis of the position information acquired from the pickup coil 3, and calculates the amount of movement from the ground coil 30 on the basis of the speed information acquired from the tacho-generator 4 and the elapsed time after passing through the ground coil 30, to thereby identify the current position of the train 21. The on-board control apparatus 1 transmits the position information on the train 21 to the ground control apparatus 32 via the on-board radio apparatus 6 and the antenna 5. The on-board control apparatus 1 generates a stop pattern of the train 21 on the basis of the movement authority limit information acquired from the ground control apparatus 32, and controls the operation of the train 21 in accordance with the stop pattern. The stop pattern indicates a relationship between a distance from a point to be a stop target and a maximum speed at each distance. By controlling the operation of the train 21 as described above, the on-board control apparatus 1 supports the unmanned operation in which the train 21 automatically stops at the target stop point in each station.

The on-board control transmission apparatuses 7 and 7a transmit acquired information to each other, and receive the transmitted information from each other. The information acquired by each of the on-board control transmission apparatuses 7 and 7a includes information on train intervals measured by the non-contact range sensors 2 and 2a. The on-board control transmission apparatuses 7 and 7a change the operation mode of the train 21 on the basis of an instruction from the operation management apparatus 34. When the on-board control apparatus 1 fails, the on-board control transmission apparatuses 7 and 7a control operations of the brake control apparatus 8 and the propulsion control apparatus 9 using the information on the train intervals measured by the non-contact range sensors 2 and 2a, thereby to control the operation of the train 21. For example, when being instructed to start control using the second train interval, the on-board control transmission apparatuses 7 and 7a control the operation of the train 21 using the second train interval on the basis of the instruction from the operation management apparatus 34.

The brake control apparatus 8 causes the train 21 to decelerate or stop on the basis of control by the on-board control apparatus 1 or the on-board control transmission apparatuses 7 and 7a. The propulsion control apparatus 9 causes the train 21 to depart or accelerate on the basis of the control by the on-board control apparatus 1 or the on-board control transmission apparatuses 7 and 7a.

Next, an operation of the train control system 70 will be described. First, a normal operation thereof when the on-board control apparatus 1 does not fail in each of the trains 20 to 22 will be described. When the trains 20 to 22 are operating normally, each on-board control apparatus 1 identifies the current position of the train using the position information received from the ground coil 30 when passing through the ground coil 30 and information on the amount of movement based on the speed information acquired from the tacho-generator 4. The on-board control apparatus 1 periodically transmits the position information on the current position of the train to the wireless base station 31 via the on-board radio apparatus 6 and the antenna 5.

The wireless base station 31 transmit the position information acquired from each train to the ground control apparatus 32. In this way, the ground control apparatus 32 collects position information on multiple trains within the control zone. The ground control apparatus 32 acquires position information on a train out of the control zone from another ground control apparatus 32 via the ground transmission line 33. The ground control apparatus 32 manages the positions of the trains traveling within the control zone, and calculates the movement authority limit of each train in order to prevent collision of the trains within the control zone. The ground control apparatus 32 transmits movement authority limit information to each train via the wireless base station 31.

In the train that has acquired the movement authority limit information, the on-board control apparatus 1 calculates a stop pattern for stopping the train at a position somewhat before the movement authority limit with reference to deceleration of the train, route gradient data, speed limit data, and the like, for the movement authority limit. When the on-board control apparatus 1 acquires a departure instruction from the operation management apparatus 34 via the ground transmission line 33, the ground control apparatus 32, the wireless base station 31, the antenna 5, and the on-board radio apparatus 6, the apparatus 1 causes the train to depart. With referencing to the route gradient data, the speed limit data, and other necessary data stored in a storage unit (not illustrated), and according to movement authority limit and other restriction information from the ground control apparatus 32, the on-board control apparatus 1 controls the speed of the train so that the speed of the train is controlled and the train stops at a stopping position in a station. In the train control system 70 illustrated in FIG. 1, since such a system configuration is used, unmanned operation of the train can be performed without a train operator boarding and conducting the operation control on the train in a case where the components of the system are working normally.

Here, if the on-board control apparatus fails, a failed train in which the on-board control apparatus has failed cannot transmit position information on the train to the ground control apparatus. Since the position of the failed train becomes indeterminate, the ground control apparatus cannot perform the unmanned operation of the failed train. In addition, also for the following train traveling behind the failed train, the ground control apparatus cannot calculate the movement authority limit of the following train because the position of the failed train is indeterminate, and the ground control apparatus cannot perform the unmanned operation of the following train. If assuming, as a comparative example, a train control system that does not perform a failed train operation process described later in the present application, the failed train stops for ensuring safety in the comparative example. In addition, the following train stops before the movement authority limit which has been acquired most recently, for ensuring safety in the comparative example. In the comparative example, it is necessary for the train operator to board the failed train and move the failed train to a refuge track in order to restore normal operation of the trains on all tracks. In contrast, in the train control system 70 of the present embodiment, the failed train can be moved to the refuge track without the train operator boarding the failed train because the failed train operation process is performed.

Figure 2:
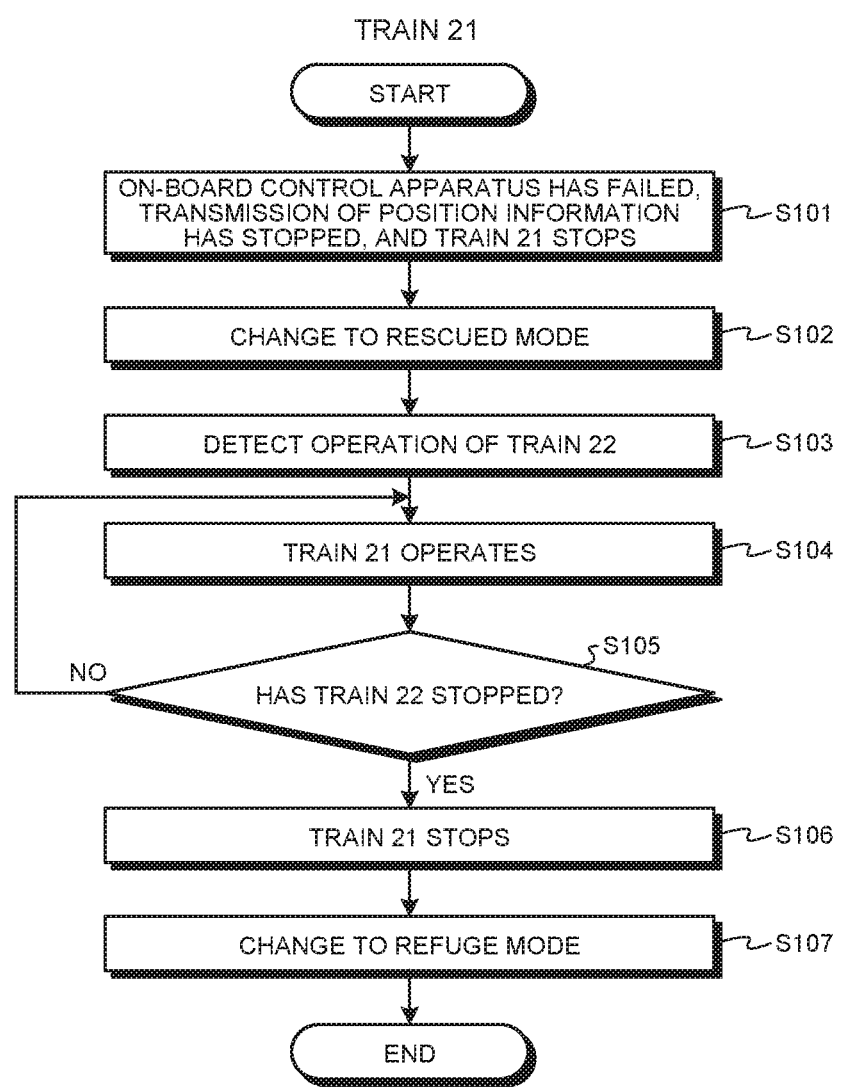
FIG. 2 is a flowchart illustrating a failed train operation process of a train in which an on-board control apparatus according to the first embodiment has failed.
Figure 3:
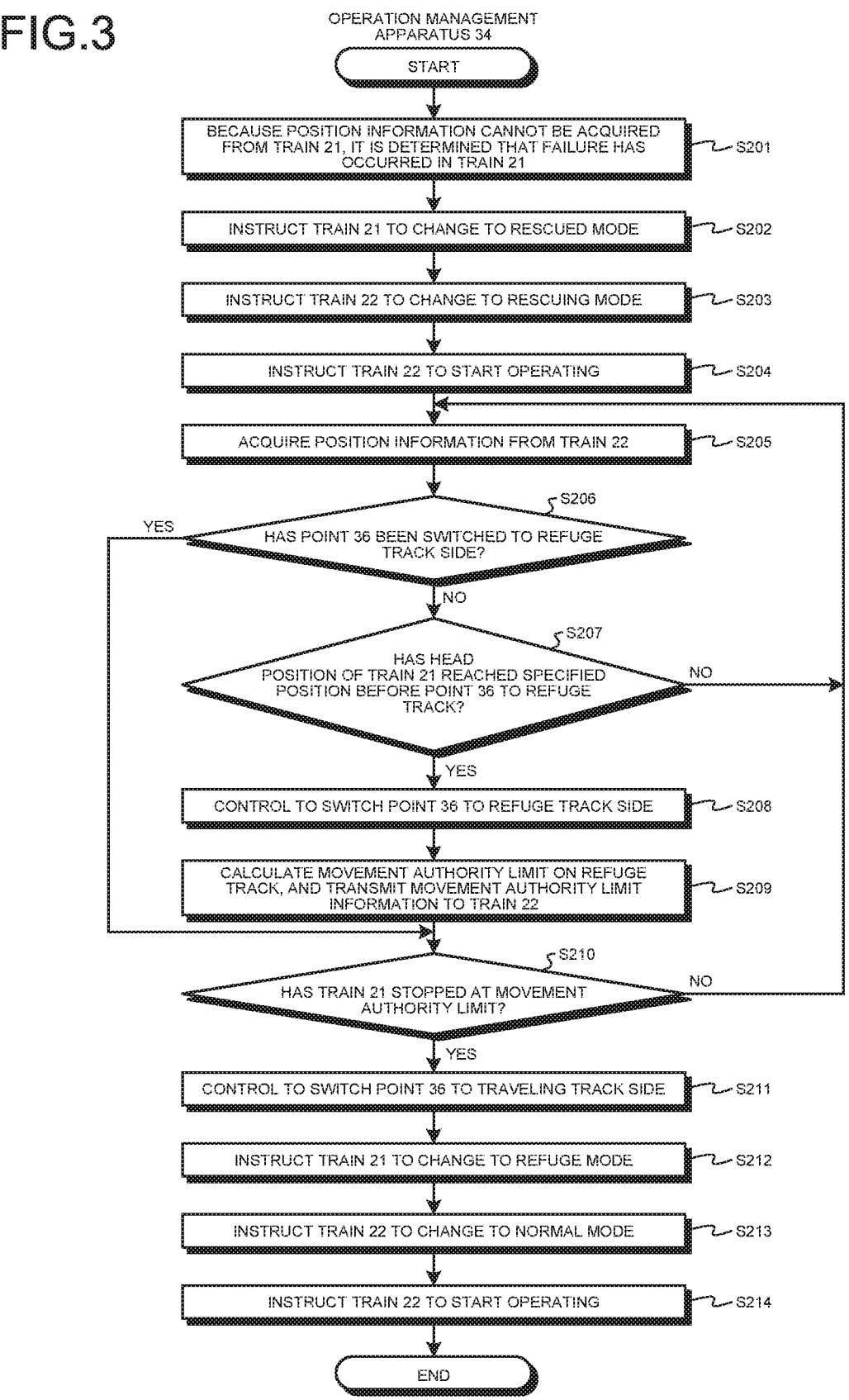
FIG. 3 is a flowchart illustrating a failed train operation process of an operation management apparatus according to the first embodiment.
Figure 4:
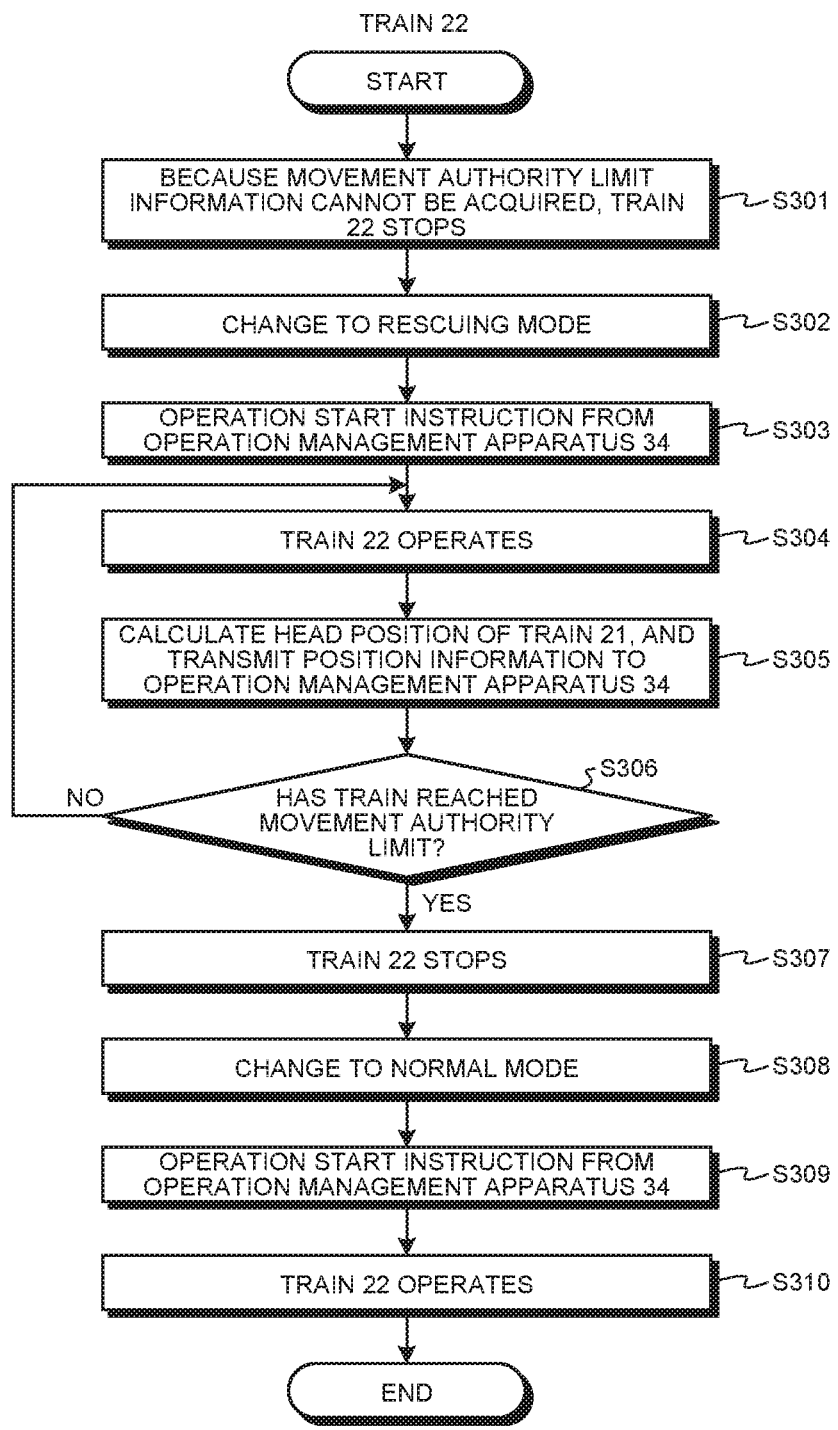
FIG. 4 is a flowchart illustrating a failed train operation process of a following train behind the train in which the on-board control apparatus according to the first embodiment has failed.

Next, the failed train operation process will be described which is performed when a train fails in the train control system 70 of the present embodiment. As an example, a case is assumed where the on-board control apparatus 1 of the train 21 has failed. FIG. 2 is a flowchart illustrating a failed train operation process of the train 21 in which the on-board control apparatus 1 according to the first embodiment has failed. FIG. 3 is a flowchart illustrating a failed train operation process of the operation management apparatus 34 according to the first embodiment. FIG. 4 is a flowchart illustrating a failed train operation process of the train 22 that is a following train behind the failed train 21 in which the on-board control apparatus 1 according to the first embodiment has failed.

As illustrated in FIG. 2, if the on-board control apparatus 1 fails, the train 21 cannot identify the current position. The train 21 stops transmission of the position information to the ground control apparatus 32, the transmission having been periodically performed by the on-board control apparatus 1. The on-board control transmission apparatus 7 monitors an operation of the on-board control apparatus 1, determines that the on-board control apparatus 1 has failed because the on-board control apparatus 1 has stopped the transmission of the position information, and controls the brake control apparatus 8 to stop the train 21 (Step S101).

As illustrated in FIG. 3, in the operation management apparatus 34, the control unit 42 determines that some failure has occurred in the train 21 because the position information on the train 21 has been unable to be acquired from the ground control apparatus 32 for a specified period (Step S201).

The ground control apparatus 32 cannot calculate the movement authority limit for the train 22 because the position information cannot be acquired from the train 21. Therefore, the ground control apparatus 32 stops calculating the movement authority limit and transmitting the movement authority limit information for the train 22. As illustrated in FIG. 4, in the train 22, the on-board control apparatus 1 stops the train 22 because the movement authority limit information cannot be acquired from the ground control apparatus 32 (Step S301).

Figure 5:
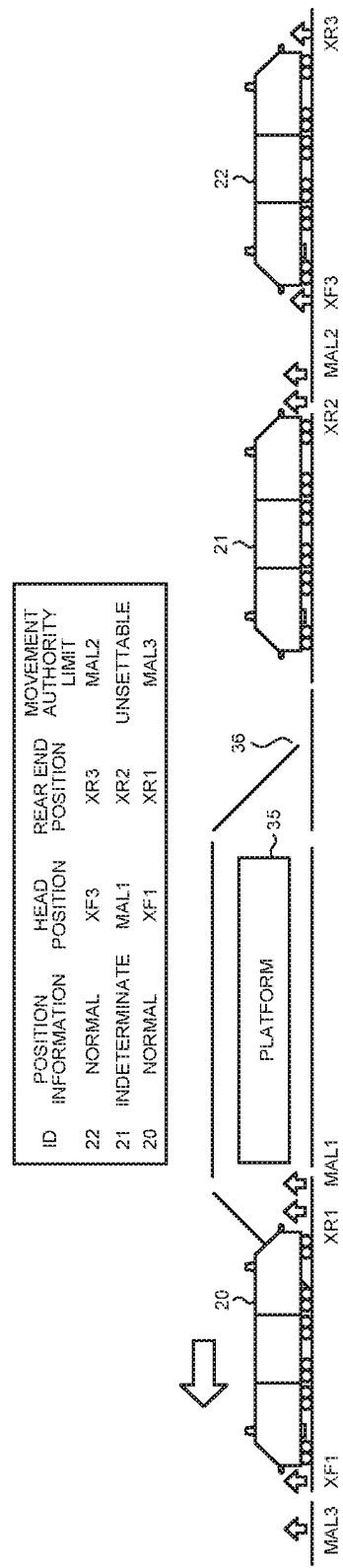
FIG. 5 is a diagram illustrating a positional relationship among trains immediately after the on-board control apparatus of the train fails in the train control system according to the first embodiment.

FIG. 5 is a diagram illustrating a positional relationship among the trains immediately after the on-board control apparatus 1 of the train 21 fails in the train control system 70 according to the first embodiment. In FIG. 5, a track on a left side of a platform 35 with respect to a train travel direction is a traveling track on which a train travels at the time of normality, and a track on a right side of the platform 35 with respect to the train travel direction is a refuge track to which a failed train is moved for escape thereof. The refuge track may be provided at a signal station or the like in addition to the station having the platform 35. The operation management apparatus 34 uses a point machine 36 to control whether to cause the train to enter a traveling track side or a refuge track side. Immediately after the on-board control apparatus 1 of the train 21 has failed, the train 21 cannot transmit latest position information to the ground control apparatus 32. Therefore, in the operation management apparatus 34, a head position of the train 21 is assumed, with a maximum margin, to be MAL1 which is a movement authority limit acquired last time, a rear end position of the train 21 is assumed to be XR2 obtained by adding a train length to the head position that has been normally acquired most recently, and a movement authority limit of the train 21 is unsettable because the latest position information is indeterminate. On the other hand, the train 22 is in a normal state. Therefore, in the operation management apparatus 34, a head position of the train 22 is XF3 detected by the train 22, a rear end position of the train 22 is XR3 detected by the train 22, and a movement authority limit of the train 22 is MAL2 set by the ground control apparatus 32 on the basis of the rear end position XR2 of the train 21. In addition, the train 20 is in a normal state. Therefore, in the operation management apparatus 34, a head position of the train 20 is XF1 detected by the train 20, a rear end position of the train 20 is XR1 detected by the train 20, and a movement authority limit of the train 20 is MAL3 set by the ground control apparatus 32 on the basis of a rear end position of a preceding train (not illustrated).

As illustrated in FIG. 3, in the operation management apparatus 34, the control unit 42 instructs the train 21 that cannot transmit the position information, to change the current mode to the rescued mode that is an operation mode in which train operation is performed at a specified train interval from the train 22 (Step S202). The train 21 that is a failed train may be referred to as a first train. The specified train interval is a train interval between the train 21 and the train 22, which is set to a third train interval with a margin of several meters in both directions in one of which the train interval becomes smaller and in another of which the train interval becomes larger with respect to a center value which is, for example, 100 m. As illustrated in FIG. 2, in the train 21, when the on-board control transmission apparatus 7 receives an instruction to change the mode to the rescued mode from the operation management apparatus 34, the on-board control transmission apparatus 7 changes the operation mode of the train 21 from the normal mode during normal operation to the rescued mode (Step S102). The above-described control using the second train interval based on the instruction from the operation management apparatus 34 is control in the rescued mode.

As illustrated in FIG. 3, in the operation management apparatus 34, the control unit 42 instructs the train 22 that is a following train of the train 21 that cannot transmit the position information to change the mode to the rescuing mode that is an operation mode in which train operation is performed at a specified speed (Step S203). The train 22 that is a following train of the failed train may be referred to as a second train. The specified speed is, for example, 10 km/h, but is not limited thereto. As illustrated in FIG. 4, in the train 22, when the on-board control transmission apparatus 7 receives the instruction to change the mode to the rescuing mode from the operation management apparatus 34, the on-board control transmission apparatus 7 changes the operation mode of the train 22 from the normal mode during normal operation to the rescuing mode (Step S302). The order of the processes in Steps S202 and S203 may be permutated.

As illustrated in FIG. 3, in the operation management apparatus 34, the control unit 42 instructs the train 22 to start operating (Step S204). As illustrated in FIG. 4, in the train 22, when the on-board control apparatus 1 receives an operation start instruction from the operation management apparatus 34 (Step S303), the on-board control apparatus 1 controls the operations of the brake control apparatus 8 and the propulsion control apparatus 9 in the rescuing mode to operate the train 22 at the specified speed (Step S304).

In the train 21, the on-board control transmission apparatus 7 acquires information on the second train interval that is a train interval between the train 21 and the train 22, measured by the non-contact range sensor 2a, via the on-board control transmission apparatus 7a. As illustrated in FIG. 2, when the on-board control transmission apparatus 7 detects the operation of the train 22 from the information on the second train interval (Step S103), the on-board control transmission apparatus 7 controls the operations of the brake control apparatus 8 and the propulsion control apparatus 9 so that the second train interval becomes equal to the third train interval, thereby to control the operation of the train 21 (Step S104). For example, when the second train interval becomes equal to 95 m, the on-board control transmission apparatus 7 controls the operation of the train 21 so that the second train interval becomes equal to 100 m. Here, a case will be described in which the on-board control transmission apparatus 7 controls the operation of the train 21, but the on-board control transmission apparatus 7a can also control the operation of the train 21.

As illustrated in FIG. 4, in the train 22, when the operation in the rescuing mode is started, the on-board control apparatus 1 calculates the position of the leading car of the train 21, and transmits position information on the train 21 and the train 22 including the position of the leading car of the train 21 to the operation management apparatus 34 via the ground control apparatus 32 (Step S305). Specifically, the on-board control apparatus 1 uses, as the head position of the train 21, that is, the position of the train 21 and train 22, a position obtained by adding the train length of the train 21 and the first train interval that is a train interval between the train 21 and the train 22, measured by the non-contact range sensor 2, to the head position of the train 22 in a forward direction thereof. The on-board control apparatus 1 may store information on the train length of the train 21 in advance, or may acquire the information from the operation management apparatus 34.

Figure 6:
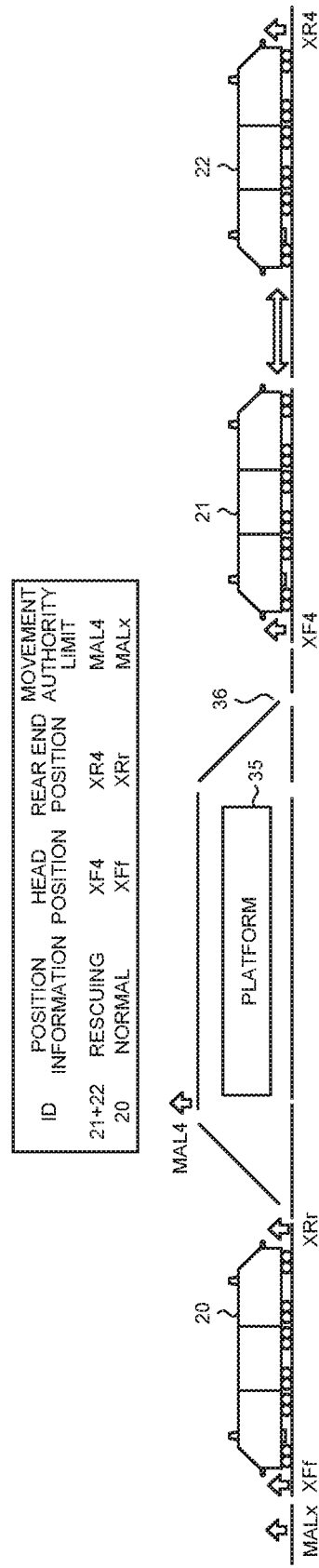
FIG. 6 is a diagram illustrating a positional relationship among the trains when one train is operated in a rescued mode and another train is operated in a rescuing mode in the train control system according to the first embodiment.

FIG. 6 is a diagram illustrating a positional relationship among the trains when the train 21 is operated in the rescued mode and the train 22 is operated in the rescuing mode in the train control system 70 according to the first embodiment. Regarding the train 21 and the train 22, the position information is calculated by the train 22 in the rescuing mode. In the operation management apparatus 34, the head position of the train 21 and train 22 is XF4 at the head of the train 21, the rear end position of the train 21 and train 22 is XR4 at the rear end of the train 22, and the movement authority limit of the train 21 and train 22 is MAL4 where the train 21 is to be stopped on the refuge track. On the other hand, the train 20 is in a normal state. Therefore, in the operation management apparatus 34, the head position of the train 20 is XFf detected by the train 20, the rear end position of the train 20 is XRr detected by the train 20, and the movement authority limit of the train 20 is MALx set by the ground control apparatus 32 on the basis of the rear end position of a preceding train (not illustrated).

As illustrated in FIG. 3, in the operation management apparatus 34, the control unit 42 acquires the position information from the train 22 via the ground control apparatus 32 (Step S205). The control unit 42 checks whether or not the point machine 36 intended to perform switching to the refuge track to which the train 21 is moved for escape has been switched to the refuge track side (Step S206). If the point machine 36 has been switched to the refuge track side (Step S206: Yes), the control unit 42 proceeds to a process of Step S210. If the point machine 36 has not been switched to the refuge track side (Step S206: No), the control unit 42 determines whether or not the head position of the train 21 indicated by the position information has reached the specified position before the point machine 36 for the refuge track (Step S207). If the train 21 has not reached the specified position before the point machine 36 (Step S207: No), the control unit 42 returns to the process of Step S205. If the train 21 has reached the specified position before the point machine 36 (Step S207: Yes), the control unit 42 performs control to switch the point machine 36 from the traveling track side for the normal operation to the refuge track side (Step S208). The control unit 42 calculates a position where the train 21 is to be stopped on the refuge track as a movement authority limit, and transmits movement authority limit information to the train 22 via the ground control apparatus 32 (Step S209). The control unit 42 may notify the ground control apparatus 32 of the stop position of the train 21 on the refuge track, and the ground control apparatus 32 may generate the movement authority limit information on the basis of the acquired stop position of the train 21 on the refuge track and transmit the movement authority limit information to the train 22.

As illustrated in FIG. 4, in the train 22, the on-board control apparatus 1 determines whether or not the head position of the train 21 has reached the movement authority limit indicated by the acquired movement authority limit information (Step S306). If the head position of the train 21 has not reached the movement authority limit (Step S306: No), the on-board control apparatus 1 returns to Step S304 and continues the operation of the train 22. If the head position of the train 21 has reached the movement authority limit (Step S306: Yes), the on-board control apparatus 1 stops the train 22 (Step S307).

As illustrated in FIG. 3, in the operation management apparatus 34, the control unit 42 determines whether or not the train 21 has stopped at the movement authority limit on the refuge track on the basis of the position information acquired from the train 22 (Step S210). If the train 21 has not stopped at the movement authority limit on the refuge track (Step S210: No), the control unit 42 returns to Step S205. If the train 21 has stopped at the movement authority limit on the refuge track (Step S210: Yes), the control unit 42 performs control to switch the point machine 36 from the refuge track side to the traveling track side (Step S211).

As illustrated in FIG. 2, in the train 21, the on-board control transmission apparatus 7 determines whether or not the train 22 has stopped on the basis of the information on the second train interval measured by the non-contact range sensor 2a (Step S105). The on-board control transmission apparatus 7 determines whether or not the train 22 has stopped, for example, by comparing the latest second train interval measured by the non-contact range sensor 2a with the previous second train interval(s). If the train 22 has not stopped (Step S105: No), the on-board control transmission apparatus 7 returns to Step S104 and continues the operation of the train 21. If the train 22 has stopped (Step S105: Yes), the on-board control transmission apparatus 7 stops the train 21 so that the second train interval becomes equal to the third train interval (Step S106).

Figure 7:
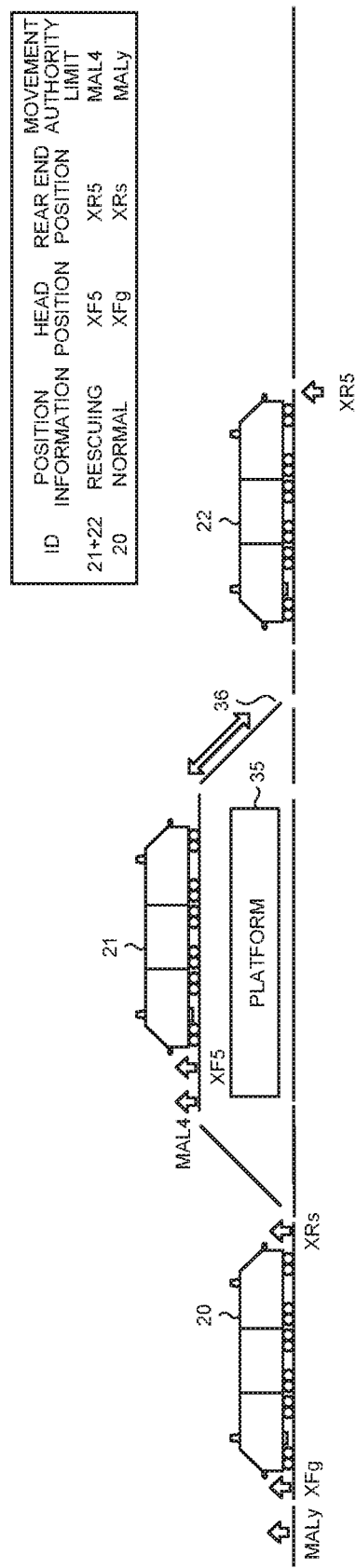
FIG. 7 is a diagram illustrating a positional relationship among the trains when a train stops at a movement authority limit on a refuge track in the train control system according to the first embodiment.

FIG. 7 is a diagram illustrating a positional relationship among the trains when the train 21 stops at the movement authority limit on the refuge track in the train control system 70 according to the first embodiment. FIG. 7 illustrates a state in which the point machine 36 has been switched to the refuge track side before being switched to the traveling track side. Regarding the train 21 and the train 22, the position information is calculated by the train 22 in the rescuing mode. In the operation management apparatus 34, the head position of the train 21 and train 22 is XF5 at the head of the train 21, the rear end position of the train 21 and train 22 is XR5 at the rear end of the train 22, and the movement authority limit of the train 21 and train 22 is MAL4. On the other hand, the train 20 is in a normal state. Therefore, in the operation management apparatus 34, the head position of the train 20 is XFg detected by the train 20, the rear end position of the train 20 is XRs detected by the train 20, and the movement authority limit of the train 20 is MALy set by the ground control apparatus 32 on the basis of the rear end position of the preceding train (not illustrated).

As illustrated in FIG. 3, in the operation management apparatus 34, the control unit 42 instructs the train 21 to change the mode to the refuge mode for continuing a state in which the train 21 is stopped at a movement authority limit on a refuge track (Step S212). As illustrated in FIG. 2, in the train 21, when the on-board control transmission apparatus 7 receives an instruction to change the mode to the refuge mode from the operation management apparatus 34, the on-board control transmission apparatus 7 changes the operation mode of the train 21 from the rescued mode to the refuge mode (Step S107). The on-board control transmission apparatus 7 maintains a state where the train 21 is stopped.

As illustrated in FIG. 3, in the operation management apparatus 34, the control unit 42 instructs the train 22 to change the mode to the normal mode corresponding to a normal operation state (Step S213). As illustrated in FIG. 4, in the train 22, when the on-board control transmission apparatus 7 receives an instruction to change the mode to the normal mode from the operation management apparatus 34, the on-board control transmission apparatus 7 changes the operation mode of the train 22 from the rescuing mode to the normal mode (Step S308). As illustrated in FIG. 3, in the operation management apparatus 34, the control unit 42 instructs the train 22 to start operating, at a timing when the train 22 is allowed to depart, with reference to a train operation diagram or the like (Step S214). As illustrated in FIG. 4, in the train 22, when the on-board control apparatus 1 receives an operation start instruction from the operation management apparatus 34 (Step S309), the on-board control apparatus 1 controls the operations of the brake control apparatus 8 and the propulsion control apparatus 9 in the normal mode to operate the train 22 (Step S310).

Figure 8:
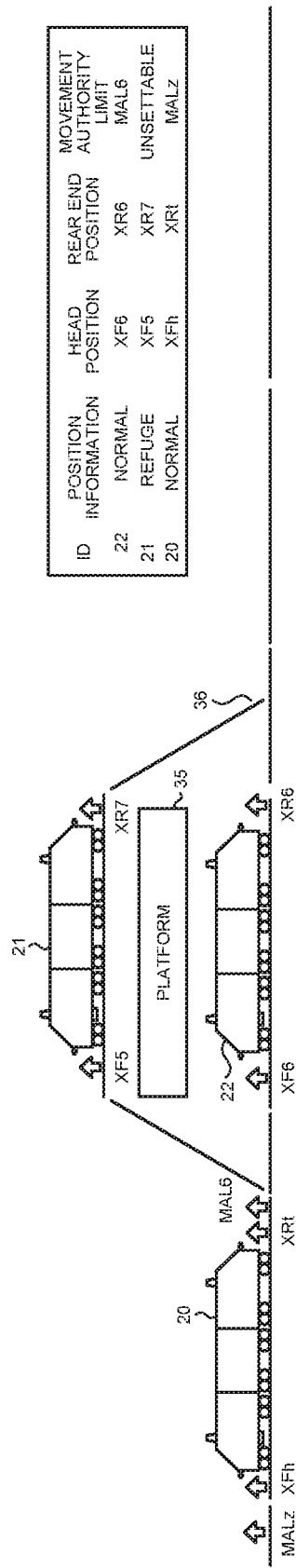
FIG. 8 is a diagram illustrating a positional relationship among the trains when a train starts operating in a normal mode in the train control system according to the first embodiment.

FIG. 8 is a diagram illustrating a positional relationship among the trains when the train 22 starts operating in the normal mode in the train control system 70 according to the first embodiment. Since the train 21 is in the refuge mode and has already stopped, the position information does not change. In the operation management apparatus 34, the head position of the train 21 is the XF5 described above, the rear end position of the train 21 is XR7 obtained by adding the train length of the train 21 to the XF5 in a rearward direction thereof, and the movement authority limit of the train 21 is not necessary and therefore is unsettable. On the other hand, the train 22 is in a normal state. Therefore, in the operation management apparatus 34, the head position of the train 22 is XF6 detected by the train 22, the rear end position of the train 22 is XR6 detected by the train 22, and the movement authority limit of the train 22 is MAL6 set by the ground control apparatus 32 on the basis of a rear end position XRt of the train 20 that is the preceding train. In addition, the train 20 is in a normal state. Therefore, in the operation management apparatus 34, the head position of the train 20 is XFh detected by the train 20, the rear end position of the train 20 is XRt detected by the train 20, and the movement authority limit of the train 20 is MALz set by the ground control apparatus 32 on the basis of the rear end position of the preceding train (not illustrated).

Next, a hardware configuration of the train operation control apparatus 10 included in each of the trains 20 to 22 will be described. Here, a hardware configuration of the train operation control apparatus 10 included in the train 21 will be described as an example. In the train operation control apparatus 10, components other than the on-board control apparatus 1, the non-contact range sensors 2 and 2a, and the on-board control transmission apparatuses 7 and 7a are similar to components used in a general train operation control apparatus. The non-contact range sensors 2 and 2a are sensors that measure a distance to a target object in a non-contact manner, and such a type of sensors are commonly used. The on-board control apparatus 1 and the on-board control transmission apparatuses 7 and 7a are realized by a processing circuit. That is, the train operation control apparatus 10 has a processing circuit that can operate the train 21 on the basis of the train interval between the train 22 which is a following train and the train 21 when the on-board control apparatus 1 of the train 21 fails, and can operate the train 21 at the specified speed when the on-board control apparatus 1 of the train 20 which is a preceding train fails. The processing circuit may be a processor that executes a program stored in a memory and the memory, or may be dedicated hardware.

Figure 9:
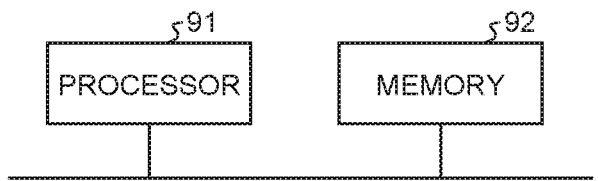
FIG. 9 is a diagram illustrating an example in which a processing circuit included in a train operation control apparatus according to the first embodiment is configured with a processor and a memory.

FIG. 9 is a diagram illustrating an example in which the processing circuit included in the train operation control apparatus 10 according to the first embodiment is configured with a processor and a memory. When the processing circuit is configured with a processor 91 and a memory 92, functions of the processing circuit of the train operation control apparatus 10 are realized by software, firmware, or any combination of software and firmware. The software or the firmware is described as a program and stored in the memory 92. In the processing circuit, the processor 91 reads and executes the program stored in the memory 92, thereby realizing the functions. That is, the processing circuit includes the memory 92 for storing programs with which the followings are executed as a result: operating the train 21 on the basis of the train interval between the train 22 which is a following train and the train 21 when the on-board control apparatus 1 of the train 21 fails; and operating the train 21 at the specified speed when the on-board control apparatus 1 of the train 20 which is a preceding train fails. It can also be said that these programs cause a computer to execute procedures and methods of the train operation control apparatus 10.

Here, the processor 91 may be a central processing unit (CPU), a processing device, an arithmetic device, a microprocessor, a microcomputer, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disc (DVD).

Figure 10:
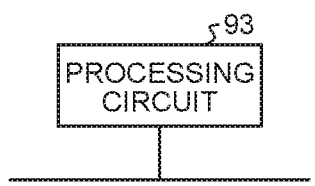
FIG. 10 is a diagram illustrating an example in which a processing circuit included in the train operation control apparatus according to the first embodiment is configured with dedicated hardware.

FIG. 10 is a diagram illustrating an example in which the processing circuit included in the train operation control apparatus 10 according to the first embodiment is configured with dedicated hardware. When the processing circuit is configured with dedicated hardware, the processing circuit 93 illustrated in FIG. 10 corresponds to, for example, a single circuit, a composite circuit, a programmed processor, a parallel programmed processor, an application specific integrated circuit (ASIC), a field programmable gate array (FPGA), or any combination of them. Functions of the train operation control apparatus 10 may be each separately realized in correspondence with the processing circuit 93, or the functions may be collectively realized by the processing circuit 93.

Some of the functions of the train operation control apparatus 10 may be realized by dedicated hardware and some other thereof may be realized by software or firmware. Thus, the processing circuit can realize each of the above-described functions based on dedicated hardware, software, firmware, or any combination of them.

The hardware configuration of the train operation control apparatus 10 has been described, but the same applies to a hardware configuration of the control unit 42 of the operation management apparatus 34. In the operation management apparatus 34, the communication unit 41 is a communicator. The storage unit 43 is a memory. The control unit 42 is realized by a processing circuit. This processing circuit may similarly be the processor 91 that executes a program stored in the memory 92 and the memory 92 as illustrated in FIG. 9, or may be dedicated hardware as illustrated in FIG. 10.

As described above, according to the present embodiment, in the train control system, the following train behind the failed train is operated at the specified speed for the failed train in which the on-board control apparatus has failed, and the failed train is operated so that the train interval between the following train and the failed train becomes equal to the specified train interval. The following train calculates the position information covering the failed train, and stops its operating when the head position of the failed train has reached the movement authority limit on the refuge track. Once the following train stops, the failed train stops operating so that the train interval between the following train and the failed train becomes equal to the specified train interval. By so doing, the train control system can operate the failed train without any situation where the operator has to board the failed train in which the on-board control apparatus has failed, and can move the failed train to the refuge track for escape thereof.

Second Embodiment

In the first embodiment, if the head position of the train 21 has reached the movement authority limit on the refuge track, the train 22 which is a following train stops. In order to adjust the train interval between the train 21 and the train 22 to the specified train interval, the train 21 stops when the train 22 stops. In a second embodiment, if the head position of the train 21 has reached the movement authority limit on the refuge track, a ground control apparatus instructs the train 21 to stop. Differences from the first embodiment will be described.

FIG. 11 is a diagram illustrating how a ground control apparatus 32a according to the second embodiment detects positions of the trains 21 and 22 using a train detection apparatus 37 and track circuits 51 to 57. The train control system 70 according to the second embodiment has a configuration obtained by performing, with respect to the train control system 70 according to the first embodiment, replacement of the ground control apparatus 32 with the ground control apparatus 32a, and addition of the train detection apparatus 37 and the track circuits 51 to 57. Other configurations in the second embodiment are similar to those in the first embodiment.

The train detection apparatus 37 applies an electrical current to rails. In the track circuits 51 to 57, when a train enters them, two rails are short-circuited by an axle of the train. The train detection apparatus 37 can identify a track circuit in which the train is present by detecting that the return of the current from the track circuits 51 to 57 stops or that a voltage becomes zero. In the example of FIG. 11, the train detection apparatus 37 can identify that the trains are present in the track circuits 54 and 55. The train detection apparatus 37 and the track circuits 51 to 57 may be of types commonly used.

The ground control apparatus 32a can know the positions of the trains by acquiring train on-track information on the track circuit which indicates that the train is present on a track, from the train detection apparatus 37. In addition, the ground control apparatus 32a acquires position information from the train 22. In a case where the on-board control apparatus 1 of the train 21 fails, the ground control apparatus 32a acquires position information including the head position of the train 21 from the train 22. That is, the ground control apparatus 32a can know that the train 21 is present in the track circuit 54, on the basis of the position information acquired from the train 22 and the train on-track information acquired from the train detection apparatus 37. When the ground control apparatus 32a detects that the train 21 is present on the refuge track, in the track circuit 54 in the example of FIG. 11, the ground control apparatus 32a instructs the train 21 to stop. Thus, the ground control apparatus 32a can stop the train 21 on the refuge track.

In the train 22, the on-board control apparatus 1 can detect that the train 21 has stopped, from the train interval between the train 21 and the train 22, measured by the non-contact range sensor 2. When detecting that the train 21 has stopped, the on-board control apparatus 1 of the train 22 stops the train 22.

A configuration of the ground control apparatus 32a will be described. The ground control apparatus 32a includes a communication unit 61, a control unit 62, and a storage unit 63. The communication unit 61 transmits and receives information between the unit 61 and the operation management apparatus 34 via the wireless base station 31 and the ground transmission line 33. The control unit 62 manages positions of the trains and calculates movement authority limits thereof. The storage unit 63 stores collected position information pieces on multiple trains. A hardware configuration of the ground control apparatus 32a is similar to that of the operation management apparatus 34.

Next, a failed train operation process will be described, which is to be performed when a train has failure in the train control system of the present embodiment. FIG. 12 is a flowchart illustrating a failed train operation process of the train 21 in which the on-board control apparatus 1 according to the second embodiment has failed. FIG. 13 is a flowchart illustrating a failed train operation process of the train 22 that is a following train behind the failed train 21 in which the on-board control apparatus 1 according to the second embodiment has failed. FIG. 14 is a flowchart illustrating a failed train operation process of the ground control apparatus 32a according to the second embodiment. An operation of the operation management apparatus 34 is similar to that in the first embodiment. Hereinafter, differences from the first embodiment will be described.

As illustrated in FIG. 14, in the ground control apparatus 32a, the control unit 62 acquires the position information transmitted by the train 22 in Step S305 (Step S401). The control unit 62 also acquires train on-track information on the track circuits 51 to 57 from the train detection apparatus 37 (Step S402). The control unit 62 determines whether or not the train 21 is present on the refuge track on the basis of the acquired position information and train on-track information (Step S403). If the train 21 is not present on the refuge track (Step S403: No), the control unit 62 returns to Step S401 and continues to acquire each piece of the information. If the train 21 is present on the refuge track (Step S403: Yes), the control unit 62 instructs the train 21 to stop (Step S404).

As illustrated in FIG. 12, in the train 21, the on-board control transmission apparatus 7 checks, after starting the operation of the train 21 in Step S104, whether or not a stop instruction has been acquired from the ground control apparatus 32a (Step S108). If the stop instruction has not been acquired from the ground control apparatus 32a (Step S108: No), the on-board control transmission apparatus 7 returns to Step S104 and continues the operation of the train 21. If the stop instruction has been acquired from the ground control apparatus 32a (Step S108: Yes), the on-board control transmission apparatus 7 stops the train 21 (Step S106). Other operations for the train 21 are similar to those in the first embodiment.

As illustrated in FIG. 13, in the train 22, the on-board control apparatus 1 determines, after transmitting the position information in Step S305, whether or not the train 21 has stopped (Step S311). As described above, the on-board control apparatus 1 can detect that the train 21 has stopped from the train interval between the train 21 and the train 22 measured by the non-contact range sensor 2. If the train 21 has not stopped (Step S311: No), the on-board control apparatus 1 returns to Step S304 and continues the operation of the train 22. If the train 21 has stopped (Step S311: Yes), the on-board control apparatus 1 stops the train 22 so that the first train interval becomes equal to the third train interval (Step S307). Other operations for the train 22 are similar to those in the first embodiment.

In the second embodiment, the train detection apparatus 37 detects presence of a train on a track using the track circuits 51 to 57, but the presence of a train on a track may be detected using a different method. For example, in a case where multiple axle detection apparatuses are installed on the ground side, when an axle detection apparatus at one point detects that an axle of a train has passed and another axle detection apparatus at the next point does not detect the passage of the axle of the train, the train detection apparatus 37 can detect that the train is present on a track between these two axle detection apparatuses. In addition, in a case where an ID transmission apparatus is installed in each train and an ID is transmitted to the ground side, when a ground-side reception apparatus installed at one point receives the ID and another ground-side reception apparatus installed at the next point does not receive the ID, the train detection apparatus 37 can detect that the train is present on a track between these two reception apparatuses.

As described above, according to the present embodiment, in the train control system, when the ground control apparatus detects that a failed train is present on the refuge track on the basis of the train on-track information on the track circuit and the position information on the following train, the ground control apparatus instructs the failed train to stop its own operation. By doing so, the train control system can directly instruct the failed train to stop the operation.

The configurations described in the above embodiments are merely examples of the content of the present invention, and can be combined with other publicly known techniques and partially omitted and/or modified without departing from the gist of the present invention.

REFERENCE SIGNS LIST

1 on-board control apparatus; 2, 2a non-contact range sensor; 3 pickup coil; 4 tacho-generator; 5, 5a antenna; 6, 6a on-board radio apparatus; 7, 7a on-board control transmission apparatus; 8 brake control apparatus; propulsion control apparatus; 10 train operation control apparatus; 20 to 22 train; 30 ground coil; 31 wireless base station; 32, 32a ground control apparatus; ground transmission line; 34 operation management apparatus; 35 platform; 36 point machine; 37 train detection apparatus; 41, 61 communication unit; 42, 62 control unit; 43, 63 storage unit; 51 to 57 track circuit; 70 train control system.

The invention claimed is:

1. A train operation control apparatus mounted on a train, the apparatus comprising:
   a range sensor to measure a train interval between a head of a following train traveling behind the train and a rear end of the train; and
   an on-board control transmission apparatus to control operation of the train using the train interval when being instructed to start control using the train interval on the basis of an instruction from an operation management apparatus that controls operation of a plurality of trains including the train and the following train,
   wherein an instruction to start control using the train interval is provided when transmission of position information from the train to a ground control apparatus is stopped, and
   the train operation control apparatus further comprises:
   a first range sensor to measure a first train interval between a rear end of a preceding train traveling ahead of the train and a head of the train; and
   an on-board control apparatus to generate a stop pattern of the train on the basis of movement authority limit information acquired from the ground control apparatus and control operation of the train in accordance with the stop pattern, wherein
   the range sensor is used as a second range sensor and the train interval measured by the second range sensor is used as a second train interval,
   on the basis of an instruction acquired from the operation management apparatus, the on-board control transmission apparatus changes an operation mode of the train to a rescuing mode in which train operation is performed at a specified speed, and
   in the rescuing mode, the on-board control apparatus calculates a head position of the preceding train using information on a train length of the preceding train and information on the first train interval, transmits information on the head position of the preceding train to the operation management apparatus, and operates the train at the specified speed using movement authority limit information acquired from the operation management apparatus.

2. The train operation control apparatus according to claim 1, wherein
   when the head position of the preceding train reaches a specified stop position on a refuge track on which the preceding train is to be stopped, the on-board control apparatus stops the train.

3. The train operation control apparatus according to claim 1, wherein
when the preceding train stops on the basis of an instruction from the ground control apparatus, the on-board control apparatus stops the train so that the first train interval becomes equal to a third train interval specified.

4. An operation management apparatus comprising:
a storage unit capable of storing position information on a plurality of trains acquired from a ground control apparatus that collects the position information on the plurality of trains; and
a control unit to, when position information on a first train is not acquired from the ground control apparatus for a specified period, instruct a second train that is a train traveling behind the first train to change a mode to a rescuing mode in which train operation is performed at a specified speed, and instruct the first train to change a mode to a rescued mode in which train operation is performed with a train interval between the first train and the second train being adjusted to a specified train interval, wherein
on the basis of the position information on the first train, the control unit controls a point machine to cause the first train to enter a refuge track, and when the first train stops at a specified movement authority limit on the refuge track, the control unit instructs the first train to change a mode to a refuge mode in which a stop state on the refuge track is continued, and instructs the second train to change a mode to a normal mode that corresponds to a normal operation state.

5. A train control system comprising:
an operation management apparatus to, when position information on a first train is not acquired for a specified period from a ground control apparatus that collects position information on a plurality of trains, instruct a second train that is a train traveling behind the first train to change a mode to a rescuing mode in which train operation is performed at a specified speed, and instruct the first train to change a mode to a rescued mode in which train operation is performed with a train interval between the first train and the second train being adjusted to a specified train interval;
the second train to, while operating in the rescuing mode, measure a train interval between the first train and the second train using a range sensor, calculate a head position of the first train using information on a train length of the first train and information on the measured train interval, transmit information on the head position of the first train to the operation management apparatus, and perform train operation at the specified speed using movement authority limit information acquired from the operation management apparatus; and
the first train to, while operating in the rescued mode, measure a train interval between the first train and the second train using a range sensor, and perform train operation such that the measured train interval becomes equal to a specified train interval.

6. The train control system according to claim 5, wherein
when the head position of the first train reaches a specified stop position on a refuge track on which the first train is to be stopped, the second train stops,
when the second train stops, the first train stops so that the measured train interval becomes equal to the specified train interval, and
the operation management apparatus controls a point machine to cause the first train to enter a refuge track, and when the first train stops at a specified movement authority limit on the refuge track, the operation management apparatus instructs the first train to change a mode to a refuge mode in which a stop state on the refuge track is continued, and instructs the second train to change a mode to a normal mode that corresponds to a normal operation state.

7. The train control system according to claim 5, wherein
when the first train acquires a stop instruction from the ground control apparatus, the first train stops,
when the first train stops, the second train stops so that the measured train interval becomes equal to the specified train interval, and
the operation management apparatus controls a point machine to cause the first train to enter a refuge track, and when the first train stops at a specified movement authority limit on the refuge track, the operation management apparatus instructs the first train to change a mode to a refuge mode in which a stop state on the refuge track is continued, and instructs the second train to change a mode to a normal mode that corresponds to a normal operation state.

* * * * *